UNITED STATES PATENT OFFICE 2,580,019

METHOD FOR WASHING BUTYL REACTORS WITH ISOBUTYLENE

Leslie R. Gould and Graham George Wanless, Sarnia, Ontario, Canada, assignors to Standard Oil Development Company, a corporation of Delaware No Drawing. Application October 9, 1946, Serial No. 702,096

6 Claims. (Cl. 260—85.3)

This invention relates to low temperature polymerization processes; relates particularly to maintenance of clean reactor conditions; and relates especially to the removal of adherent polymer from the walls of the reactor by the use of warm liquid isobutylene.

It has been found possible to prepare an extremely valuable polymer by the copolymerization of isobutylene with a multi olefin having from 4 to 14 carbon atoms per molecule such as butadiene, isoprene, piperylene, dimethallyl, myrcene, and the like, the preferred commercial mixture being isobutylene in major proportion and isoprene in minor proportion, the usual commercial range being from 90 to 99% isobutylene with from 10 to 1% of isoprene. The polymerization is usually conducted at a temperature within the range between −40° C. and −164° C., the usual commercial temperature being a little above −88° C., as set by liquid ethane, or preferably from −92 to −100° C., as set by liquid ethylene in a refrigerating jacket on the reactor. The catalyst is a Friedel-Crafts active metal halide in solution in a low-freezing, non-complex-forming solvent, the catalyst solution being added in the form of as mall stream into the body of the rapidly stirred, cold, olefinic material. A diluent is usually utilized in the proportion of from ½ volume to 5 to 10 volumes of the mixed olefinic material to produce the desired polymer. However, considerable difficulty is encountered in the reaction because of the fact that the polymerization reaction throws out the polymer in the form of a solid, a portion of which adheres to the walls of the reactor and to the stirrer in an extremely tenacious coating which is difficult to remove, and, if allowed to remain, increases the thermal gradient through the reactor walls to such an extent that the desired low polymerization temperature cannot be maintained, and on the stirrer, the coating of adherent polymer changes the contours of the stirrer to such an extent as to destroy its circulating power and to increase the energy required for rotation to a prohibitively high value. The adhesion of the polymer and the tough, rubbery character of the polymer make it extremely difficult to remove by hand, and the number of solvents available is quite small. Attempts have been made to remove the adherent coating by the solvent action of light naphtha, but the solubility is comparatively low and the viscosity of even a dilute solution is very high. In consequence, an excessive amount of light naphtha is required, and the resulting solution is extremely difficult to handle because of its viscous, sticky character with the result that about the only thing which can be done with this polymer solution is to send it to the cracking coil recycle supply, which is a waste of valuable material.

According to the present invention, it is now found that if liquid isobutylene at room temperature or somewhat above, under sufficient pressure to maintain the liquid condition, is used as a cleaning material, the polymer does not dissolve in the warm liquid isobutylene, but is solvated enough to reduce its toughness and adhesivity to such a point that the circulating power of the stirrer is sufficient to disintegrate the solvated polymer and break it away from the metal surfaces, and then the liquid isobutylene containing the fragments of solvated polymer may be discharged through the usual reactor outlet into the usual flash tank in which most of the isobutylene is driven off and returned just as unpolymerized olefins are returned from the normal polymerization reaction through the recycle purifying equipment, and the polymer is delivered in the form of a water slurry substantially identical to that of the normal polymerization procedure; with the result that no light naphtha is required, no solvent is lost, and no polymer is lost, with the further very great advantage that no heavy, viscous, sticky, thick solution must be handled, and no hand-cleaning operation is required.

Thus the process of the reaction delivers to a fouled reactor a supply of liquid isobutylene under pressure at a temperature near to room temperature (over a range of temperatures from about −6° C. to about +30° C.) to solvate the adherent polymer sufficiently to bring its strength to such a value that the normal circulating equipment will dislodge the solvated polymer, which, in suspension in a stream of liquid isobutylene, is then discharged to a water-containing flash tank in which the isobutylene is volatilized and sent to the recycle equipment, and the polymer, in water slurry, is sent through the normal filtering, drying and milling equipment. Other objects and details of the invention will be apparent from the following description:

The primary reaction to which the present invention is applied is a low temperature polymerization reaction as shown in U. S. Patents 2,356,127 and 2,356,128 on a continuous scale, conducted in equipment of the type disclosed in Serial No. 448,575 filed June 26, 1942 by John H. Bannon, now abandoned, or Serial No. 545,099 filed July 15, 1944 by Joseph Nelson; the subject matter of which cross-references is herewith incorporated into and made a part of the present disclosure.

In the reactor described in aforesaid Serial No. 448,575, a draft tube provided with an agitator is arranged centrally within the reactor and a plurality of return tubes is arranged between headers arranged around the central draft tube with means for circulating a suitable refrigerant such as liquid ethylene through the space between the headers and around the central draft tube as well as the return tubes. Serial No. 545,099 describes an improved reactor which is constructed with a central draft tube provided with an impeller causing turbulent flow and a return tube made in the form of an annular passageway completely surrounding the draft tube; and provision is made for maintaining a refrigerant in contact with each of the wall surfaces with which the reactants comes into contact.

The primary raw material for the process to which the present invention is applied is isobutylene having a purity of from 98 to 99.5% or better. The secondary raw material is a conjugated diolefin of 4 to 6 carbon atoms such as butadiene, isoprene and piperylene, dimethyl butadiene, or more generally a multiolefin or multiolefinic unsaturate having from 4 to 14 carbon atoms per molecule including such substances as cyclopentadiene, dimethyllal, myrcene, allo-ocymene, and the like, these substances being representative of all of the organic unsaturates having from 4 to 14 carbon atoms per molecule without regard to the presence of substituents on or in the aliphatic chain. These materials are defined as multiolefinic unsaturates and this definition is intended to cover any organic compound having more than one carbon to carbon double linkage without regard to the presence of substituents such as oxygen, halogen, or the like, in or on the aliphatic chain and brings within the scope of the definition such substances as the unsaturated ethers, either the simple ethers or mixed ethers, and analogous compounds including aryl substituted unsaturates such as styrene, the various halo-substituted styrenes, and the like.

Primarily, this invention is applicable to processes and apparatus for the polymerization of multiolefinic unsaturates without regard to the matter of admixture or proportions, but commercially the most common useage is for the copolymerization of a major proportion of isobutylene with a minor proportion of a multi olefin to yield an elastomer, as defined by Fisher in his article on "The nomenclature of synthetic rubbers" in the August, 1939 issue of "Industrial and Engineering Chemistry" beginning on page 941. Commercially, the principal mono olefin for the manufacture of an elastomer is isobutylene but the reaction is not limited to isobutylene as the mono olefin since many other olefins are also useable.

The multi olefinic unsaturates may be used alone, but commercially it is usually preferable to add to it a diluent which does not participate directly in the reaction, in the proportion of from about ½ volume to 5 to 10 volumes; the presence of the diluent having a helpful effect on the characteristics of the resulting polymer, especially when an elastomer is prepared. For the diluent, it is required only that it have a freezing point below the reaction temperature and that it be inert with respect both to the catalyst and to the other olefinic materials; that is, that it does not react chemically in any way with the catalyst, or the multi olefinic unsaturates, or the finished polymer. Preferred diluents are the halogen-substituted aliphatics which are defined for the purposes of this specification as halo-substituted aliphatics and includes such substances as alkyl chlorides of less than 3 carbon atoms such as ethyl and methyl chloride, as well as methylene dichloride, chloroform, ethylene dichloride and trichloride and various of the fluoro-chloro compounds. Suitable diluents are also found in various of the lower boiling hydrocarbons; in carbon disulfide and in a limited number of other substances which broadly are inert with respect to the reaction.

For the production of an elastomer, it is desirable that the material be cooled to a temperature to below $-40°$ C., the preferred temperatures being between about $-80°$ C. and $-100°$ C. The cooling is preferably obtained by the use of a refrigerating jacket upon the polymerization reactor in which the desired refrigerant is contained. Suitable refrigerants are such substances as liquid ethylene or liquid ethane, liquid or solid carbon dioxide, occasionally liquid ammonia or liquid sulfur dioxide, or the lower boiling fluoro-chloro alkyls, or the like. (In a limited number of instances an "internal" refrigerant may be used; that is, a low boiling inert liquid may be mixed directly with the polymerizable olefinic material.) For this purpose, such substances as liquid ethylene or liquid ethane, or liquid or solid carbon dioxide, or occasionally liquid propane are particularly suitable. In some instances, the internal refrigerant serves both as a refrigerant and as diluent.

The polymerization is conducted under the influence of a Friedel-Crafts active metal halide catalyst which is preferably used in solution in a low-freezing, non-complex-forming solvent; the preferred catalyst being aluminum chloride, the preferred solvent being ethyl or methyl chloride. However, for the Friedel-Crafts active metal halide catalyst, any of the substances disclosed by N. O. Calloway in his article on "The Friedel-Crafts Synthesis" printed in the issue of "Chemical Reviews" published for the American Chemical Society at Baltimore, in 1935, in volume XVII, No. 3, the article beginning on page 327, the list being particularly well shown on page 375, may be used; and, in addition, a number of double salts may be used including such compounds as aluminum chloro bromide, aluminum chloro alkoxide, and the like, these all being defined as active metal halides. For the catalyst solvent a considerable range of substances is available including the mono or poly substituted alkyls above listed as diluents; and with certain of the Friedel-Crafts active halide metals, the lower hydrocarbons such as ethane, propane, butane, pentane, and the like, are similarly useful. For the solvent, it is required only that it dissolve a sufficient amount of the catalyst salt and that it be low-freezing and non-complex-forming. To be low-freezing, it is only necessary that it have a freezing point below the freezing point of water; and to be non-complex-forming, it is necessary only that there shall not separate from the catalyst solution on evaporation of the solvent, a compound between the solvent and the Friedel-Crafts catalyst, or that upon the addition of the solvent in the form of a vapor to the catalyst solute at constant temperature there shall be a substantially continuous change in the composition of the catalyst phase and a continual increase in the partial pressure of the solvent, and that in general, the catalyst can be recovered unchanged merely by removal of the solvent.

According to the present invention, the olefinic mixture is preferably prepared by the admixture of steady streams of the respective components; and the catalyst solution is prepared by the passage of a steady stream of catalyst solvent over a layer of the catalyst substances, if solid, or by admixture of the catalyst and solvent, if both are fluid; and the delivery of steady streams of reaction mixture and catalyst solution to the reactor as shown in the above mentioned copending applications. The reaction is begun by filling the reactor with an appropriate reaction mixture and bringing the temperature to the proper value, then beginning the delivery of catalyst. The reaction begins promptly and continues as long as steady streams of reactant mixture and catalyst solution are delivered to the reactor, a slurry of the polymer in unpolymerized mixture being discharged from the reactor, the whole of the reaction mixture being vigorously stirred by the stirrers shown in the above-mentioned copending applications. The reaction will proceed smoothly for from 10 hours to 150 hours, during which time a layer of adherent polymer gradually builds up on the inner surface of the reactor vessel, and on the stirrer and shaft. Eventually, the layer of polymer becomes so thick as to interfere seriously with the transfer of heat from the reaction mixture through the reactor walls to the refrigerant, and the reaction temperature becomes unduly high; with an accumulation of adherent polymer on the stirring propeller such as to require excessive amounts of power to maintain its rotation and to maintain adequate stirring of the reaction mixture. When this stage is reached, the reactor must be shut down and cleaned; involving the interruption of the stream of reaction mixture and catalyst, and usually the draining and warming of the reactor.

According to the present invention, when this stage of "fouling" is reached, the refrigerating jacket is drained of refrigerant, and preferably filled with warm gaseous ethylene to bring the reactor temperature up to or above normally ambient temperature. Simultaneously, the cold residual reaction mixture with its contained slurry of polymer may be withdrawn from the reactor, or may be displaced by a stream of warm liquid isobutylene. When the temperature of the mixture in the reactor reaches about −6° C., the isobutylene will boil if the pressure is retained at atmospheric pressure, and, accordingly, as the temperature rises, a valve on the outlet is closed to throttle down the outflow of material. This is readily accomplished by the use of a valve in the discharge line leading to the water-containing flash tank and the valve is desirably adjusted to such an amount of opening as to maintain the reactor substantially full of warm liquid isobutylene. Simultaneously, the stirrer is operated at its normal speed in order to maintain a rapid and powerful circulation of the liquid isobutylene.

The polymer does not dissolve to any substantial extent in the warm isobutylene, and accordingly, the liquid contents of the reactor do not become unduly viscous. However, the solid polymer is solvated by the liquid isobutylene and swollen and somewhat disintegrated by the solvating effect, and the vigorous liquid friction exerted by the rapidly circulating liquid isobutylene erodes from the surface of the adherent polymer small particles of solvated polymer which aid in the erosion of further amounts of solvated polymer. The delivery of a steady stream of fresh liquid isobutylene then results in the overflow through the valve of an equivalent stream of isobutylene containing the fragments of solvated polymer. This stream, of course, boils in part as it passes through the valve but sufficient remains to carry the solvated polymer on into the water in the flash tank where the remainder of the isobutylene is vaporized and the polymer slurried in the water, during which slurrying, much of the solvating isobutylene is also driven out from the solid polymer. The slurrying is conveniently facilitated by a slurrying agent to maintain the fine-grained character of the slurry, zinc stearate, as shown in the copending applications of P. K. Frolich, Serial No. 428,834, filed January 30, 1942, and Serial No. 610,838, filed August 13, 1945, now U. S. Patents 2,456,265 and 2,523,289, respectively, being particularly useful. The stream of warm isobutylene is continued under the influence of the stirrer until the walls and stirrer are freed from adherent polymer. When this stage is reached, the stream of warm liquid isobutylene under pressure may be discontinued and replaced by a stream of cold olefinic polymerized mixture, with the delivery of a stream of liquid ethylene to the reactor jacket, the two serving to bring the reactor down to the desired reaction temperature. Alternatively, the stream of warm liquid isobutylene may be interrupted and the discharge valve opened to allow the isobutylene to vaporize, the vapor being delivered to the flash tank and from the tank to the recycle equipment in normal course. A portion only of the contained isobutylene will vaporize before the temperature is brought down to −6° C. at which isobutylene boils under atmospheric pressure and the remainder may then be drained in any convenient way, leaving the reactor clean and empty for any attention which may be required, such as examination or replacement of catalyst jets, or the like. When such attention has been completed, the reactor may then be brought into operation in the usual way by the delivery of a stream of liquid ethylene to the reactor jacket to bring the reactor temperature to the desired value, and the delivery of a stream of cold reactant mixture until the reactor is full, followed by the delivery of a stream of catalyst in normal procedure.

By this process, it is thus readily convenient to operate a polymerization reactor until the limiting layer of adherent polymer is formed, then to solvate and erode the polymer layer from the inner surfaces by the application of a strongly circulated warm stream of isobutylene with a steady overflow of liquid isobutylene and solvated polymer to the normal polymer recovery equipment until the reactor is clean, after which, normal operation may be resumed without further interruption.

*Example 1*

A polymerization reactor as shown in the above-mentioned copending applications was put into operation by delivering to the refrigerating jacket a supply of liquid ethylene, which was continued, with discharge of gasified ethylene from the discharge pipe to the compressors in which it was compressed and cooled until the reactor temperature was brought down below about −90° C. Simultaneously, a supply of liquid isobutylene and a supply of liquid isoprene were mixed and cooled in a heat interchanger until they also were brought down to a temperature close to —90° C. When the reactor was adequately cooled, a stream of the mixed isobutylene and isoprene was mixed with a stream of methyl chloride diluent and delivered to the cold reactor. When the reactor was full, and a small steady stream of mixed olefins and diluent was overflowing through the outlet pipe, a stream of catalyst solution in the form of an 0.3% solution of aluminum chloride in methyl chloride was delivered to the reactor, the reactor contents being vigourously stirred and circulated by the propeller stirrer shown in the copending applications. The polymerization reaction began within a relatively short time when the catalyst concentration in the mixture had reached the minimum required values. When this point was reached, the discharge of clear mixed olefins and diluent was replaced by a discharge of polymer slurry in unpolymerized material; the volatiles in the discharged overflow being vaporized by the warm water in the flash tank shown and a slurry of polymer in water formed, which was drained from the flash tank, the polymer strained out from the water and dried, milled and packaged for shipment. This reaction proceeded smoothly for a period of approximately 20 hours during which time a small but definite proportion of polymer adhered to the walls of the reactor forming a layer or blanket on the inside of the reactor walls and a coating on the propeller stirrer.

When this layer or blanket had reached a thickness of approximately 0.2 inch, it was found that the thermal gradient through the coating and the steel walls of the reactor amounted to approximately 12° C., bringing the inner surface of the blanket to a temperature of about —85° C. with the body of the reaction mixture at a still higher temperature; this temperature being too high for the production of satisfactory polymer. When this condition was reached, the stream of catalyst was discontinued, the supply of liquid ethylene to the refrigerating jacket interrupted, and the supply of isobutylene, isoprene and methyl chloride interrupted; and replaced by warm liquid isobutylene.

The supply of liquid isobutylene displaced the polymer slurry in the reactor carrying the last of the solid polymer out into the flash tank and substantially raising the temperature of the reactor contents. At this point a valve on the discharge duct was partly closed to maintain a substantial pressure upon the reactor for the purpose of preventing boiling of the warm isobutylene. The reactor and its contents in the course of about an hour reached a temperature of about 20° C. and a pressure on the reactor of approximately 40 pounds per square inch. The agitator was continued in operation during the whole of this time to yield a very strong sweeping current of liquid isobutylene throughout the reactor, and as the temperature of the isobutylene approached 20° C., larger and larger portions of the surface of the polymer coating were solvated, swelled, disintegrated and the toughness and strength reduced to such an extent that the sweeping stream of warm liquid isobutylene was sufficiently powerful to erode from the surface substantial particles of solvated, softened polymer which, by their mechanical action, eroded still further portions of the solvated polymer layer from the coating. These particles were carried out of the reactor with the outflowing stream through the partly closed outlet valve and dropped into the warm water in the flash tank, in which substantially the whole of the isobutylene was vaporized, leaving a slurry of polymer in water with relatively minor amounts only of isobutylene retained in the solid polymer. In the course of approximately three hours after the temperature of the reactor contents reached room temperature, the whole of the polymer lining had been solvated, eroded, washed away and removed from the reactor, leaving all of the interior surfaces of the reactor clean and free from adherent polymer. When this stage was reached, the stream of warm isobutylene was discontinued and replaced by a stream of cold mixed olefins and diluent of the general type used in the original filling of the reactor and simultaneously a small stream of liquid ethylene was delivered to the refrigerating jacket. Opening of the valve on the outlet, to release the pressure, allowed a sufficient amount of the isobutylene to boil to bring the reactor temperature down to approximately —6° C. and atmospheric pressure. Continuance of the stream of cold mixed olefins and diluent and continuance of the stream of liquid ethylene brought the reactor temperature and the temperature of its contents down below —90° C., at which point the stream of catalyst solution was started as before and the polymerization reaction continued in the usual manner.

It may be noted that this procedure did not involve the opening of the reactor chamber and did not involve the loss of any hydrocarbon material since only components of the normal polymerization mixture were used and a minimum of time was required for the clearing of the reactor.

*Example 2*

A polymerization run was conducted as described in Example 1 using a similar stream of mixed isobutylene and isoprene cooled with liquid ethylene in the reactor jacket; polymerized with a stream of a solution of a Friedel-Crafts catlyst in a low freezing non-complex-forming solvent until the layer of adherent polymer on the inner surface of the reactor had reached a thickness of approximately 0.2 inch. When this stage was reached, the polymerization was discontinued by stopping the catalyst supply; and the feed was changed to consist simply of liquid isobutylene cooled just enough to be liquid at atmospheric pressure. This feed was continued until the polymer slurry previously formed in the reactor had been displaced. Simultaneously, the supply of liquid ethylene to the refrigerating jacket was discontinued and replaced by a stream of hot gaseous ethylene, the temperature being, by this means, brought up to the boiling point of isobutylene at atmospheric pressure by the time the slurry was displaced. The valve on the overflow outlet was then nearly closed to hold pressure on the reactor and the temperature was brought up still higher to about room temperature, with the propeller stirrer in operation. Solvating of the adherent polymer continued actively and the polymer was relatively rapidly removed from the walls and discharged from the overflow into the flash tank where the isobutylene was recovered and sent to the purification system for reuse. When the reactor was substantially cleaned, the supply of liquid isobutylene was discontinued and replaced by a supply of solvent naphtha (Varsol, or 57° naphtha) the flow being continued until the reactor was full of naphtha and the pressure released.

Soon after the flow of naphtha was started, the discharge was diverted from the flash tank to an auxiliary storage tank to avoid contamination of product with undesirable quantities of naphtha. This diversion did not result in any loss of product, since the warm naphtha volatilized the isobutylene which was returned in gaseous form to the recycle system; and there remained in the tank nearly pure solvent. When the pressure had been released from the polymerizer, a bottom drain was opened and the naphtha drained out from the reactor. By this process the handling of large amounts of isobutylene as gas from the reactor with the inherent cooling to the boiling temperature of the isobutylene, and the necessity for providing large amounts of additional heat to the reactor were avoided, and as soon as the solvent naphtha had drained from the reactor, the head was removed for inspection. This procedure was found to be highly advantageous, since the reactor could be entered by workmen immediately without any wait to bring the structure up to a safe working temperature.

This procedure was found to have the further advantage that any small amounts of adherent polymer not sufficiently solvated by the warm liquid isobutylene were rapidly dissolved and removed by the solvent naphtha leaving an absolutely clean reactor inner surface; yet at the same time so little polymer dissolved in the solvent naphtha that it remained useable for the same purpose repeatedly. Accordingly, the solvent naphtha was run to storage and saved for repetition of this procedure in the same or other reactors when the reactor needed to be entered for examination or repair.

This procedure is advantageous as an alternative, since it combines in one operation, removal of substantially all of the adherent polymer, recovery of the adherent polymer free from all contaminants and at the same time brings the reactors into condition for entry and inspection without delay for emptying or warming.

Thus the procedure of the reaction polymerizes an olefinic mixture at low temperature until the limiting thickness of adherent polymer layer is produced within the reactor, whereafter the supplies of cold reactants and catalyst are interrupted and replaced by a warm stream of one component of the reaction mixture in which the polymer is only slightly soluble, but by which the polymer is solvated and softened sufficiently to permit the erosive effect of a rapid stream of fluid to erode from the surface successive portions of polymer until the layer is completely removed, the polymer being delivered to the normal polymer recovery process and the solvating liquid being delivered to the normal recycle process to recover as useable polymer all of the polymer which otherwise adheres to the reactor surface, without the use of a special solvent, without the introduction of material which could contaminate the recycle stream and without loss either of polymer or cleaning material.

While there are above disclosed but a limited number of embodiments of the process of the invention, it is possible to provide still other embodiments without departing from the inventive concept herein disclosed and it is therefore desired that only such limitations be imposed on the appended claims as are stated therein or required by the prior art.

The invention claimed is:

1. In a low temperature polymerization process in which isobutylene and a multi olefin are mixed, diluted, cooled to a temperature between $-40°$ C. and $-164°$ C. and polymerized by a Friedel-Crafts catalyst at low temperature to yield a polymer slurry, a portion of which adheres to the interior of the reactor, the steps in combination of displacing the cold reaction mixture at the end of the polymerization by a stream consisting of liquid isobutylene under pressure at a temperature between $-6°$ C. and $+30°$ C., circulating the warm isobutylene rapidly over the adherent polymer to solvate it and erode it by the flowing stream, carrying out from the reactor a stream of warm isobutylene containing portions of suspended solvated polymer; and thereafter displacing the warm isobutylene from the reactor by solvent naphtha.

2. In a low temperature polymerization process in which isobutylene and a multi olefin are mixed, diluted, cooled to a temperature between $-40°$ C. and $-164°$ C. and polymerized by a Friedel-Crafts catalyst at low temperature to yield a polymer slurry, a portion of which adheres to the interior of the reactor, the steps in combination of displacing the cold reaction mixture at the end of the polymerization reaction by a stream consisting of warm liquid isobutylene under pressure at a temperature between $-6°$ C. and $+30°$ C., circulating the warm isobutylene rapidly over the adherent polymer to solvate it and erode it by the flowing stream, carrying out from the reactor a stream of warm isobutylene containing portions of suspended solvated polymer; displacing the warm isobutylene by solvent naphtha, and thereafter draining from the reactor the solvent naphtha to bring the reactor into condition for immediate entry and inspection.

3. In a low temperature polymeriaztion process in which isobutylene and a multi olefin are mixed, diluted, cooled to a temperature between $-40°$ C. and $-164°$ C. and polymerized by a Friedel-Crafts catalyst at a low temperature to yield a polymer slurry, a portion of which adheres to the interior of the reactor, the steps in combination of displacing the cold reaction mixture at the end of the polymerization reaction by a stream consisting of liquid isobutylene under pressure at a temperature between $-6°$ C. and $+30°$ C., circulating the warm isobutylene rapidly over the adherent polymer to solvate it and erode it by the flowing stream, and thereafter carrying out from the reactor a stream of warm isobutylene containing portions of suspended solvated polymer; continuing the stream of warm isobutylene until substantially all the adherent polymer is solvated and removed, then replacing the stream of warm isobutylene by a stream of cold polymerizable mixture, simultaneously refrigerating the material and when sufficient polymerizable mixture has accumulated, initiating the flow of catalyst solution.

4. In a low temperature polymerization process in which isobutylene and a multiolefinic unsaturate are mixed, diluted, cooled to a temperature between $-40°$ C. and $-164°$ C. and polymerized in a reaction zone by a Friedel-Crafts catalyst at the low temperature to yield a slurry of polymer, a portion of which adheres to the interior of the reaction zone, the steps in combination of displacing the cold reaction mixture at the end of the polymerization reaction by a stream consisting of liquid isobutylene under pressure and at a temperature between $-6°$ C. and $+30°$ C., rapidly circulating the warm isobutylene under pressure in the reaction zone over the adherent polymer to solvate it and erode it by the flowing stream, and thereafter removing from the reactor a stream of warm isobutylene containing portions of suspended solvated polymer.

5. In a low temperature polymerization process in which isobutylene and a conjugated diolefin of 4 to 6 carbon atoms are mixed, diluted, cooled to a temperature between −40° C. and −164° C. and polymerized in a reaction zone by a Friedel-Crafts catalyst at the low temperature to yield a slurry of polymer, a portion of which adheres to the interior of the reaction zone, the steps in combination of displacing the cold reaction mixture at the end of the polymerization reaction by a stream consisting of liquid isobutylene having a temperature between −6° C. and +30° C., circulating the warm isobutylene under pressure and at a temperature between −6° C. and +30° C. rapidly over the adherent polymer to solvate it and erode it by the flowing stream, thereafter removing from the reactor a stream of warm isobutylene containing portions of suspended solvated polymer, flashing off the isobutylene from the polymer in water to yield a water slurry of polymer, and condensing and returning the isobutylene to the reaction zone for reuse.

6. In a low temperature polymerization process in which a major proportion of isobutylene and a minor proportion of isoprene are mixed, diluted, cooled to a temperature between −40° C. and −164° C. and polymerized in a reaction zone by a catalyst solution of aluminum chloride dissolved in an alkyl chloride of less than 3 carbon atoms at the low temperature to yield a slurry of polymer, a portion of which adheres to the interior of the reaction zone, the steps in combination of displacing the cold reaction mixture at the end of the polymerization reaction by a stream consisting of liquid isobutylene under pressure and having a temperature between −6° C. and +30° C., circulating the warm isobutylene rapidly over the adherent polymer in the reaction zone under pressure to solvate it and erode it by the flowing stream, thereafter removing from the reaction zone a stream of warm isobutylene containing portions of suspended solvated polymer, flashing off the isobutylene from the polymer in water to yield a water slurry of polymer, and simultaneously discharging the volatilized isobutylene to a recycle system for return to the reactor as liquid isobutylene in cold reaction mixture.

LESLIE R. GOULD.
GRAHAM GEORGE WANLESS.

REFERENCES CITED

The following references are of record in the file of this patent:

UNITED STATES PATENTS

| Number | Name | Date |
|---|---|---|
| 1,582,974 | Garbarino | May 4, 1926 |
| 2,085,524 | De Simo et al. | June 29, 1937 |
| 2,356,128 | Thomas et al. | Aug. 22, 1944 |
| 2,455,665 | Ford et al. | Dec. 7, 1948 |